(12) United States Patent
Choiniere

(10) Patent No.: US 10,466,044 B2
(45) Date of Patent: Nov. 5, 2019

(54) SENSOR IMAGER AND LASER ALIGNMENT SYSTEM

(71) Applicant: BAE Systems Information and Electronic Systems Integration Inc., Nashua, NH (US)

(72) Inventor: Michael J. Choiniere, Merrimack, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 0 days.

(21) Appl. No.: 15/781,520

(22) PCT Filed: Oct. 31, 2016

(86) PCT No.: PCT/US2016/059673
§ 371 (c)(1),
(2) Date: Jun. 5, 2018

(87) PCT Pub. No.: WO2017/105649
PCT Pub. Date: Jun. 22, 2017

(65) Prior Publication Data
US 2019/0003828 A1 Jan. 3, 2019

Related U.S. Application Data

(60) Provisional application No. 62/268,814, filed on Dec. 17, 2015.

(51) Int. Cl.
*G01B 11/27* (2006.01)
*G01C 3/08* (2006.01)

(52) U.S. Cl.
CPC ............. *G01B 11/272* (2013.01); *G01C 3/08* (2013.01)

(58) Field of Classification Search
CPC ......... G01B 11/272; G01B 3/08; G03B 13/20
See application file for complete search history.

(56) References Cited

U.S. PATENT DOCUMENTS

| | | | | |
|---|---|---|---|---|
| 4,561,775 A | * | 12/1985 | Patrick | .................. G01S 7/4811 250/332 |
| 6,181,850 B1 | | 1/2001 | Nakamura et al. | |
| 8,879,072 B2 | * | 11/2014 | Langholz | ........... G01N 21/6458 250/205 |
| 2009/0284644 A1 | * | 11/2009 | McKaughan | ............ G01C 3/08 348/348 |

OTHER PUBLICATIONS

International Search Report, PCT/US2016/059673, dated Jan. 10, 2017, 9 pages.

* cited by examiner

*Primary Examiner* — Dominic J Bologna
(74) *Attorney, Agent, or Firm* — Davis & Bujold, PLLC; Scott J. Asmus

(57) ABSTRACT

The system and method of sensor imager and laser alignment. The system utilizes a DLP mirror array with a compact collimator to provide a real time, direct mapping of the laser energy from a LRF onto an imager (e.g., visible, SWIR, LWIR, or the like) by using a back scatter approach. This method eliminates the thermal and vibration/shock optical alignment issues by using a relative measurement approach significantly reducing the size, weight, and cost of the alignment system.

20 Claims, 3 Drawing Sheets

SENSOR IMAGER AND LASER ALIGNMENT SYSTEM

CROSS REFERENCE TO RELATED APPLICATIONS

This Application claims the benefit of U.S. Provisional Patent Application No. 62/268,814, filed Dec. 17, 2015, the content of which is incorporated by reference herein in its entirety.

FIELD OF THE DISCLOSURE

The present disclosure relates to the use of an imager for laser alignment and more particularly to utilizing a compact collimator that is resistant to temperature and optical component movement for laser alignment in the field.

BACKGROUND OF THE DISCLOSURE

Existing laser systems require calibration and alignment in the field, and these existing systems are sensitive to both temperature and vibration. Current alignment systems tend to be large and expensive. Certain embodiments of the present disclosure provide a low cost, small, and compact collimator to measure the alignment lasers (e.g., laser range finders (LRF)) that can be inserted in a mobile test stand.

SUMMARY OF THE DISCLOSURE

One aspect of the present disclosure is a system comprising a digital micromirror device, or DLP (digital light processing) mirror, a collimating lens, a laser range finder (LRF) receiver or energy measuring sensor, and a beam splitter.

In one embodiment, the system provides an effective and accurate means to align an out-of-band laser with an imager (e.g., visible, SWIR, MWIR, or LWIR) in real time. Certain embodiments of the disclosure can provide laser beam/profile location and energy distribution information by using a direct mapping method that is immune to optical movement due to temperature or mechanical induced shock.

In one embodiment, the sensor imager and laser alignment system comprises a light source; a DLP mirror configured to scan for laser energy; a laser energy receiver; a beam splitter; and a collimator.

One aspect of the present disclosure is a method of aligning a laser and imager system comprising, providing a light source; providing a DLP mirror; a collimator; a beam splitter; and a laser energy receiver; then scanning, with the DLP mirror, for laser energy that has been reflected off the beam splitter and through the collimator; reflecting the laser energy, with the DLP mirror, back through the collimator and through the beam splitter to the laser energy receiver; and reflecting light from a light source off the DLP mirror, passing that light through the collimator, and reflecting that light off the beam splitter and onto an imager; and then aligning the light detected by the imager with the laser energy received by the laser energy receiver, to align the imager with the laser.

Another aspect of the present disclosure is a laser alignment system, for use in aligning a laser light source with a system imager comprising, a beam splitter; a collimator; a DLP mirror configured to scan for a laser energy; a back reflecting light source; a laser energy receiver; a laser energy monitor; and a housing for packaging and protecting the laser alignment system.

One embodiment of the laser alignment system is wherein the laser energy is selected form the group consisting of visible light energy and infrared energy. In some embodiments, the laser light source is a laser range finder and the system imager is a day camera.

In an embodiment of the laser alignment system, the DLP mirror in configured to scan for energy ranging from visible light energy to infrared energy. In some cases, the beam splitter is a visible/short-wavelength infrared 99% transmitted/1% reflected beam splitter.

Another aspect of the present disclosure is a method of aligning a laser with a system imager comprising, providing a laser light source and a system imager; providing a beam splitter; providing a collimator; providing a DLP mirror configured to scan for a laser energy; providing a back-reflecting light source; providing a laser energy receiver; providing a laser energy monitor; scanning, with the DLP mirror, for laser energy that has been reflected off the beam splitter and through the collimator; reflecting the laser energy, with the DLP mirror, back through the collimator and through the beam splitter to the laser energy receiver; reflecting light from the back-reflecting light source off the DLP mirror, passing that light through the collimator, and reflecting that light off the beam splitter and onto the system imager; and aligning the light detected by the system imager with the laser energy received by the laser energy receiver, thereby aligning the system imager with the laser light source.

One embodiment of the method of aligning a laser with a system imager is wherein the laser energy is selected form the group consisting of visible light energy and infrared energy. In some embodiments, the laser light source is a laser range finder and the system imager is a day camera.

In an embodiment of the method of aligning a laser with a system imager, the DLP mirror in configured to scan for energy ranging from visible light energy to infrared energy. In some cases, the beam splitter is a visible/short-wavelength infrared 99% transmitted/1% reflected beam splitter.

Yet another aspect of the present disclosure is a method of aligning a laser with a system imager comprising providing a unit under test, where the unit under test comprises a laser light source having a laser energy and a system imager; providing a rotating stage for mounting the unit under test; providing a broad band energy source; providing a laser alignment system, comprising a beam splitter; a collimator; a DLP mirror configured to scan for the laser energy; a back-reflecting light source; a laser energy receiver; and a laser energy monitor; scanning, with the DLP mirror, for laser energy that has been reflected off the beam splitter and through the collimator; reflecting the laser energy, with the DLP mirror, back through the collimator and through the beam splitter to the laser energy receiver; reflecting light from the back-reflecting light source off the DLP mirror, passing that light through the collimator, and reflecting that light off the beam splitter and onto the system imager; aligning the light detected by the system imager with the laser energy received by the laser energy receiver, thereby aligning the system imager with the laser light source; and receiving at the system imager an energy from the broad band energy source; and aligning the broad band energy source with the unit under test by rotating the stage.

One embodiment of the method of aligning a laser with a system imager is wherein the laser energy is selected form the group consisting of visible light energy and infrared energy. In some embodiments, the laser light source is a laser range finder and the system imager is a day camera.

In an embodiment of the method of aligning a laser with a system imager, the DLP mirror in configured to scan for energy ranging from visible light energy to infrared energy. In some cases, the beam splitter is a visible/short-wavelength infrared 99% transmitted/1% reflected beam splitter.

Another embodiment of the method of aligning a laser with a system imager is wherein the broad band light source has energy within a dynamic range of the camera at a reasonable signal to noise (SNR).

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

Figure 1:
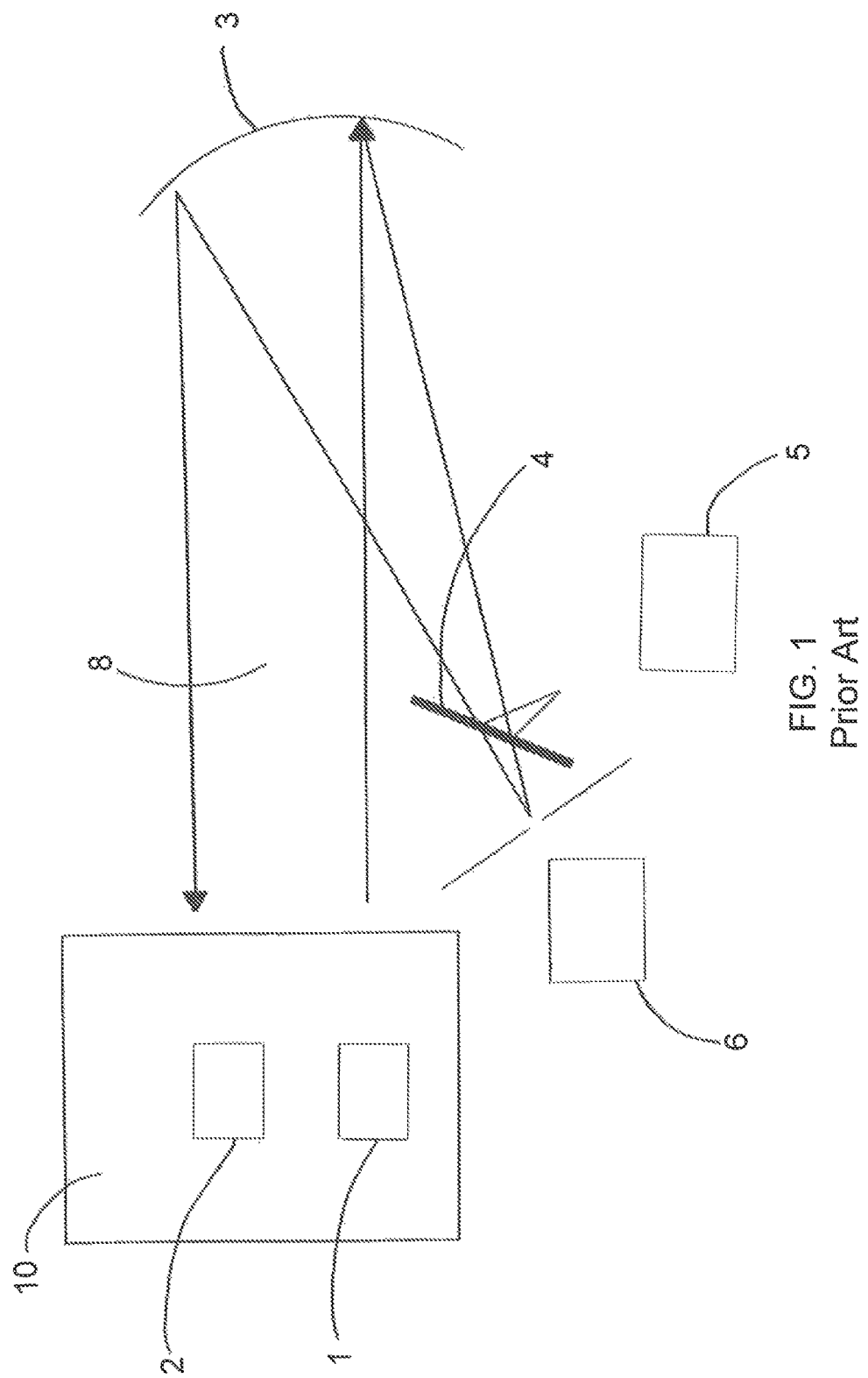
FIG. 1 shows a prior art method for aligning a laser and an imager in a system.

A DLP, or digital light processing, mirror has at its core a digital micromirror device (DMD). A DMD is a chip that has several hundred thousand microscopic mirrors on its surface arranged in an array which corresponds to pixels. Each of the individual mirrors can be rotated to an "on" or "off" state. In the "on" state, light from a light source is reflected back in the direction of a detector and the pixel is bright. In the "off" state the light is directed elsewhere making the pixel appear dark.

One embodiment of the present disclosure uses a collimating lens to image a laser beam profile (e.g. from a LRF) onto a mirror (e.g. a DLP mirror) and the reflected energy is then collected on a simple detector. In certain embodiments, by invoking varying scanning patterns on the DLP mirror, both the direction and the energy distribution of the laser can be measured. In certain embodiments, the measurement can be done by turning one pixel on at a time. In certain embodiments, the measurement can be done by using a spatial pattern of a limiting aperture generated by the DLP. The limiting aperture is formed by turning on a group of pixels in circular format. By moving the location of the group of pixels around on the DLP one can find the maximum amount of energy which corresponds to the center location of the LRF's laser. In addition, the pixel circle size can be adjusted up or down to measure the energy as a function of the circle size—thereby determining the energy distribution of the LRF's laser.

Another aspect of the present disclosure is the use of a back reflecting light source (within the imager band). This light source is reflected off the "on" DLP mirror pixels and propagated to an imager. This provides a complete mapping of the % energy from the LRF's laser relative to the imager's field of view (FOV); thereby determining the beam divergence of the laser and its position relative to the imager. This provides the ability to calibrate the alignment of the LRF and the imager on the fly as the entire system can be packaged in a low cost, portable, small, and light weight unit.

In another embodiment of the alignment system of the present disclosure, a closed loop differential measurement system is used. This method is unaffected by optical motion due to temperature and/or vibration making it ideal for field use. In certain embodiments, the system can be self-calibrated and may only take a few seconds to perform the alignment measurements.

In one embodiment, the system further comprises a plurality of lenses, a beam splitter and one or more detectors. In one embodiment, the sensor imager and laser alignment system is in 4 by 4 by 4 inch package. In others, it is even smaller, no bigger than a 3" cube. The system eliminates large, heavy collimating optics requiring a test stand that typically weigh in the 100 to 200 lb. class and reduces the test hardware to about 2 to 3 lbs. In some cases, the system may weigh <1 lb. In certain embodiments, the components costs are reduced by 10× and require no alignment maintenance when deployed to the field making this an ideal solution for weapon sights and targeting systems.

In one embodiment of this system, the laser and imager are a LRF and a day camera, respectively. In other embodiments, SWIR, MWIR and LWIR systems are used as night vision systems. In some cases, night vision goggles with intensifier tubes are used. In some systems, a digitized back end allows for application of this technique.

Referring to FIG. 1, a prior art method of measuring the alignment of a laser and an imager in a system is shown. The conventional method of aligning a laser 1 and an imager 2 is to use the setup as illustrated in FIG. 1. More particularly, a camera 5, light source 6 and an off-axis telescope 3 are aligned in the factory test setup to a high level of precision. The system imager 2 looks out and sees the collimated beam 8 from the light source 6 which identifies the center of the optical measurement system. The laser 1 is then operated and the camera 5 measures where the laser beam is relative to the center of the optical system. By these two measurements, one can determine the alignment off-set between the system laser 1 and the system imager 2 in the optical system 10.

The prior art method is difficult to use in the field. In a maintenance operation, it is very expensive and not durable and requires consistent calibration. One reason for this is the alignment measurement is solely dependent on the quality test performed on initial equipment alignment.

Figure 2:
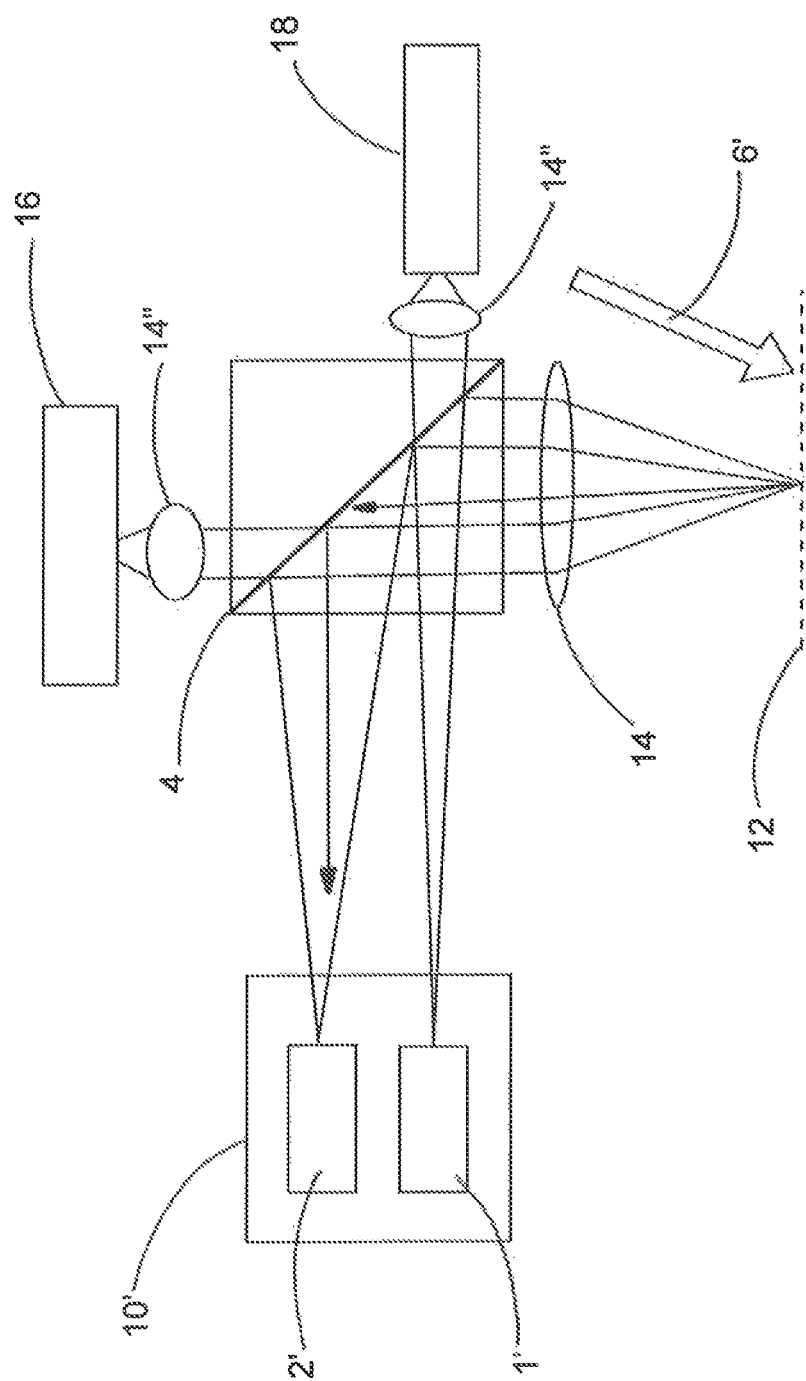
FIG. 2 shows one embodiment of the method aligning a laser and an imager in a system of the present disclosure.

One aspect of the present disclosure is to utilize a relative measurement method where the initial alignment is not critical. Referring to FIG. 2, by adding a DLP mirror 12 to an existing system, the location of the LRF's laser position and its distribution can be measured. In one embodiment, the DLP mirror is 640×480 pixels and it is mounted on an electronic chip. In certain embodiments, the mirror size is smaller than 640×480 pixels. In certain embodiments, the mirror is larger than 640×480 pixels. In other embodiments, the mirror is 1920×1200 pixels to accommodate an LRF 1' with greater beam divergence. If a wider laser beam is used, more pixels or a larger format size is required.

In one embodiment, a collimating lens 14 images a laser beam onto a DLP mirror 12 and the reflected energy is collected on a simple detector (e.g., a LRF receiver 16). Additionally, in some cases the system has a beam splitter 4'. In one example, the beam splitter is a Vis/SWIR 99% through splitter. In some cases, the LRF receiver 16 is very sensitive and receives about 1% of the laser energy, while an energy monitor 18 is also present to monitor the laser output values. The energy monitor determines the overall health of the LRF by ensuring the output energy is meeting a minimum standard for the LRF. The LRF energy is typically between 25 µJ to 20 mJ depending on the LRF's range. The variation in energy levels is controlled by attenuation filters (not shown) to adapt to the energy monitor's sensitivity/dynamic range. The accuracy/precision of the measurement could be by a single or averaged pulsed event depending on testing requirements; typically >0.2% can be achieved with a multi-pulse average.

In certain embodiments, the system is used for LRF pulse energy measurement. In certain embodiments, the unit under test (UUT) LRF output is transmitted into a LRF imaging unit, through a beam splitter and measured by an energy monitor. In certain embodiments, its output is sent to a tablet computer via USB for compliance evaluation by a test application. In certain embodiments, the LRF energy monitor is subject to closed-loop calibration, fault detection, and isolation as part of the TMDE (Test, Measurement, and Diagnostic Equipment) Built-in Test (BIT) by means of a laser reference source integral to the LRF imaging unit.

By invoking varying scanning patterns on the DLP mirror 12, both the direction and the energy distribution form the laser can be measured. In one embodiment, the measurements are gathered by turning one pixel "on" at a time. In one embodiment, a back reflecting light source (e.g., visible light source 6') reflects off the "on" DLP mirror pixels and propagates to the camera 2'. In one embodiment, the back reflecting light source 6' is within the band of the imager 2'. In one embodiment, a spatial pattern of a limiting aperture generated by the DLP mirror 12 is used instead of a pixel by pixel scan. These methods provide a complete mapping of the % energy from the LRF 1' relative to the imager's field of view (FOV); thereby knowing the beam divergence of the laser and it's position relative to the system imager 2'. This direct mapping approach limits the error of the alignment measurement to the quality of the collimator 14 and the resolution of the DLP mirror 12. Less than 50 µrads is easily achievable with no increased error due to temperature or mechanical misalignment due to temperature or induced shock common in field applications.

In certain embodiments, the system of the present disclosure is used for LRF alignment to visible and/or thermal (e.g., LWIR) cameras. In one embodiment, the UUT 10' LRF output is projected into a LRF imaging unit, through a beam splitter and onto a DLP mirror 12. The DLP scans (is turned "on" and "off") by rows and columns, reflecting the scanned LRF pulse energy back through the beam splitter 4 onto the LRF receiver 16 to locate the peak LRF pulse energy (centroid) in DLP pixel space. In one embodiment, the beam splitter 4 is a partial mirror. In some embodiments, the DLP pixel or pixel block is associated with the LRF centroid. Next, a diffuse white light source 6' is turned on and the white light point or line representing the spatial location of the LRF centroid is projected through the collimator 14 and beam splitter 4 and into the UUT's imager 2' (e.g., a visible camera aperture). The centroid of this white light point target in the imager's pixel space is then set as the point of aim for the LRF 1'.

Because the visible camera and the LRF are in different bands they have typically necessitated separate alignment protocols that occur in the lab. Because of this, there is no way of know if the equipment has failed or if it is simply out of alignment. In certain embodiments of the present disclosure, the system is lighter, smaller and cost effective, and can also be aligned and re-aligned in the field. This method can be used with various imaging systems and with various laser sources to provide a robust and mobile alignment protocol.

In certain embodiments, the system is used for LRF beam divergence measurements. In certain embodiments, the UUT LRF output is transmitted into a LRF imaging unit, through a beam splitter and a collimating lens onto the DLP. In certain embodiments, the DLP scans (e.g., turns "on" and "off") by rows and columns, reflecting the scanned LRF pulse energy back through the collimating lens and beam splitter onto the LRF receiver to locate the peak LRF pulse energy (centroid) in DLP pixel space. As seen, for example, in FIG. 2. In certain embodiments, a 20×20 DLP pixel area around this centroid is sampled pixel by pixel over successive LRF pulses (e.g., by turning individual DLP pixels on and off) to create a 3D image of the integrated LRF pulses. This image is then transmitted via USB to a tablet computer, or the like, for compliance evaluation by a test application. In certain embodiments, the LRF receiver is subject to fault detection and isolation as part of the TMDE BIT, by means of a laser reference source integral to the LRF imaging unit.

Still referring to FIG. 2, a DLP mirror provides a spatial scanning capability for both a visible camera and a LRF. There, the DLP mirror scans by pixel or by limiting aperture for LRF energy distribution. In certain embodiments, the system measures beam divergence and location. In certain embodiments, visible back scatter maps DLP mirror spatial settings onto the visible camera. The DLP mirror visible back reflection is thru a common collimator and maps the LRF energy distribution location back onto the visible camera. In some embodiments, real time alignment of the LRF energy distribution is accomplished with corresponding visible camera registration. In certain embodiments, the system performs the differential measurement and is impervious to temperature and optical component movement.

The laser alignment system of the present disclosure is useful for any wavelength. In some embodiments, the laser alignment system can be packaged in a housing and transported to the field for use. In certain embodiments, the laser alignment system comprises an LRF receiver, a beam splitter, a collimator, an LRF energy monitor, and a DLP mirror. Typically, DLP mirrors are designed for visible and near IR uses. In some cases, the DLP mirror has a transmissive window configured for the working band. With the application of the proper antireflection coatings to the window the DLP mirror can be used with SWIR, MWIR, LWIR, and the like. As referred to herein, visible light ranges from about 400 nm to about 700 nm and infrared (IR) ranges from about 700 nm to about 1 mm. The IR range is further subdivided in to near-IR (about 0.75-1.4 µm), short-wavelength IR or SWIR (about 1.4-3 µm), mid-wavelength IR, or MWIR (about 3-8 µm), long-wavelength IR, or LWIR (8-15 µm), and far-IR (about 15 µm-1 mm).

Figure 3:
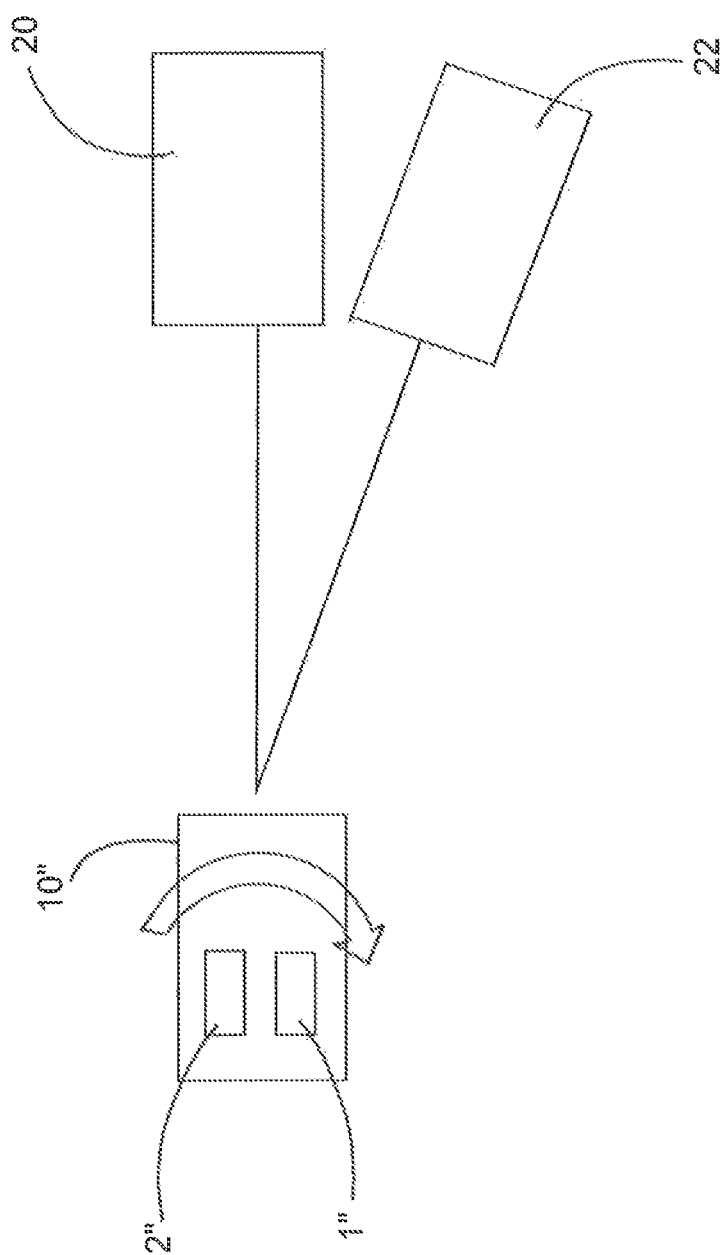
FIG. 3 shows one embodiment of the method of aligning a laser and an imager in a system of the present disclosure.

In one embodiment, instead of using a specially coated transmissive window for use with broader energy ranges, alignment of the optical system, or UUT 10", to a broadband source can be done as in see in FIG. 3. There, the laser alignment system 22 coaxially aligns thermal and/or white light point source targets into the apertures of the UUT imager 2". In one embodiment, a motorized staging is automatically driven to position the laser alignment system 22 white light point target onto the visible camera pixel set on the UUT imager 2" as the point of aim of the LRF 1" in the visible image. By using the rotary stage the UUT 10" can point to a wideband point source 20 providing a dot image in both the visible and/or thermal (e.g., LWIR) system imager 2". By knowing where a broadband point source 20 appears in the visible and/or thermal images we know the alignment between the laser 1" and the thermal imager 2", collectively 10", using the visible imager as a reference. In certain embodiments, the white dot can be used to check the alignment of the visible and/or thermal cameras over the common FOV of both cameras by incrementally indexing the rotational stage as a percentage of the common FOV; for example a 40 degree FOV could make 10 measurements across the FOV. From the data, one can determine alignment, both lateral and rotation and distortion mapping between the imagers can be accomplished. This would provide the bases of aligning imagers and lasers in the field in a system referred to as TMDE.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A laser alignment system, for use in aligning a laser light source with a system imager comprising,
    a beam splitter;
    a collimator;
    a digital light processing (DLP) mirror configured to scan for a laser energy;
    a back reflecting light source;
    a laser energy receiver;
    a laser energy monitor; and
    a housing for packaging and protecting the laser alignment system,
    wherein the DLP mirror is configured to reflect the laser energy from the back reflecting light source that is received by the system imager and the DLP mirror reflects the laser energy from the laser light source that is received by the laser energy receiver.

2. The laser alignment system of claim 1, wherein the laser energy is selected from the group consisting of visible light energy and infrared energy.

3. The laser alignment system of claim 1, wherein the laser light source is a laser range finder.

4. The laser alignment system of claim 1, wherein the system imager is a day camera.

5. The laser alignment system of claim 1, wherein the DLP mirror in configured to scan for energy ranging from visible light energy to infrared energy.

6. The laser alignment system of claim 1, wherein the beam splitter is a visible/short-wavelength infrared 99% transmitted/1% reflected beam splitter.

7. The laser alignment system of claim 1, the laser light source provides the laser energy to the energy monitor.

8. The laser alignment system of claim 1, wherein the DLP mirror scans by one or more pixels.

9. A method of aligning a laser with a system imager comprising,
    providing a laser light source and a system imager;
    providing a beam splitter;
    providing a collimator;
    providing a DLP mirror configured to scan for a laser energy;
    providing a back-reflecting light source;
    providing a laser energy receiver;
    providing a laser energy monitor;
    scanning, with the DLP mirror, for laser energy that has been reflected off the beam splitter and through the collimator;
    reflecting the laser energy, with the DLP mirror, back through the collimator and through the beam splitter to the laser energy receiver;
    reflecting light from the back-reflecting light source off the DLP mirror, passing that light through the collimator, and reflecting that light off the beam splitter and onto the system imager; and
    aligning the light detected by the system imager with the laser energy received by the laser energy receiver, thereby aligning the system imager with the laser light source.

10. The method of aligning a laser with a system imager of claim 9, wherein the laser energy is selected from the group consisting of visible light energy and infrared energy.

11. The method of aligning a laser with a system imager of claim 9, wherein the laser light source is a laser range finder.

12. The method of aligning a laser with a system imager of claim 9, wherein the system imager is a day camera.

13. The method of aligning a laser with a system imager of claim 9, wherein the DLP mirror in configured to scan for energy ranging from visible light energy to infrared energy.

14. The method of aligning a laser with a system imager of claim 9, wherein the beam splitter is a visible/short-wavelength infrared 99% transmitted/1% reflected beam splitter.

15. A method of aligning a laser with a system imager comprising
    providing a unit under test, where the unit under test comprises a laser light source having a laser energy and a system imager;
    providing a rotating stage for mounting the unit under test;
    providing a broad band energy source;
    providing a laser alignment system, comprising
        a beam splitter;
        a collimator;
        a DLP mirror configured to scan for the laser energy;
        a back-reflecting light source;
        a laser energy receiver; and
        a laser energy monitor;
    scanning, with the DLP mirror, for laser energy that has been reflected off the beam splitter and through the collimator;
    reflecting the laser energy, with the DLP mirror, back through the collimator and through the beam splitter to the laser energy receiver;
    reflecting light from the back-reflecting light source off the DLP mirror, passing that light through the collimator, and reflecting that light off the beam splitter and onto the system imager;
    aligning the light detected by the system imager with the laser energy received by the laser energy receiver, thereby aligning the system imager with the laser light source; and
    receiving at the system imager an energy from the broad band energy source; and
    aligning the broad band energy source with the unit under test by rotating the stage.

16. The method of aligning a laser with a system imager of claim 15, wherein the laser energy is selected from the group consisting of visible light energy and infrared energy.

17. The method of aligning a laser with a system imager of claim 15, wherein the laser light source is a laser range finder.

18. The method of aligning a laser with a system imager of claim 15, wherein the system imager is a day camera.

19. The method of aligning a laser with a system imager of claim 15, wherein the DLP mirror in configured to scan for energies in the range from visible light energy through infrared energy.

20. The method of aligning a laser with a system imager of claim 15, wherein the beam splitter is a visible/short-wavelength infrared 99% transmitted/1% reflected beam splitter.

* * * * *